Sept. 21, 1948.   H. L. TRAUTMANN   2,449,756
TAIL PIPE EXTENSION
Filed Feb. 18, 1947

INVENTOR.
HERBERT L. TRAUTMANN
BY Harold W. Mattingly
ATTORNEY

Patented Sept. 21, 1948

2,449,756

UNITED STATES PATENT OFFICE 2,449,756

TAIL PIPE EXTENSION

Herbert L. Trautmann, Los Angeles, Calif., assignor to Cal-Pan Corporation, Alhambra, Calif., a corporation of California Application February 18, 1947, Serial No. 729,371

1 Claim. (Cl. 285—183)

My invention relates to exhaust pipes, and has particular reference to a tail pipe extension for use on automotive vehicles.

It is well known that stock automobiles are provided with a muffler near the central portion of the vehicle, and that a tail pipe is employed to conduct the exhaust gases from the muffler to the rear of the vehicle. These tail pipes generally terminate several inches short of the rearmost portion of the vehicle, which rearmost portion is generally a bumper that is chromium plated. Accordingly, the moisture and corrosive acid fumes from the products of combustion are directed toward the chromium plated bumper, and corrosion of this portion of the bumper invariably results, while the rest of the plating on the automotive vehicle is maintained in a sound and bright condition. Tail pipe extensions accordingly are widely used to carry the exhaust gases past the end of the automobile so that they will not be directed toward the bumper or other parts of the automobile, and corrosion is thereby avoided.

My invention relates to an improved tail pipe extension that is enlarged in diameter with respect to the tail pipe diameter so that the blast effect of the exhaust gases may be reduced to obtain acoustical resonance. My invention results in a tail pipe extension that is particularly designed to fit tail pipes of any size by having an integral, expansible connection for this purpose. Further, this expansible tail pipe connection structure is combined with the portion of the tail pipe that is reduced in diameter so that the enlarged diameter of the extension will be reduced to the general diameter of the tail pipe. Further, the finished extension may be plated with chromium, nickel, or other non-corrosive substance so as to improve the appearance and durability of the extension.

It is a general object of my invention to provide an improved tail pipe extension.

Another object of my invention is to provide a tail pipe extension of simple construction formed of tubular stock.

Still another object of my invention is to provide a tail pipe extension having a diameter greatly in excess of that of the normal tail pipe and wherein the necked-down portions of the extension are so constructed as to also provide a connection that may be easily adapted to fit tail pipes of varying diameters.

Figure 1:
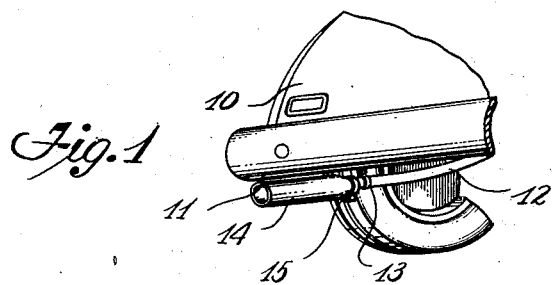
Figure 2:
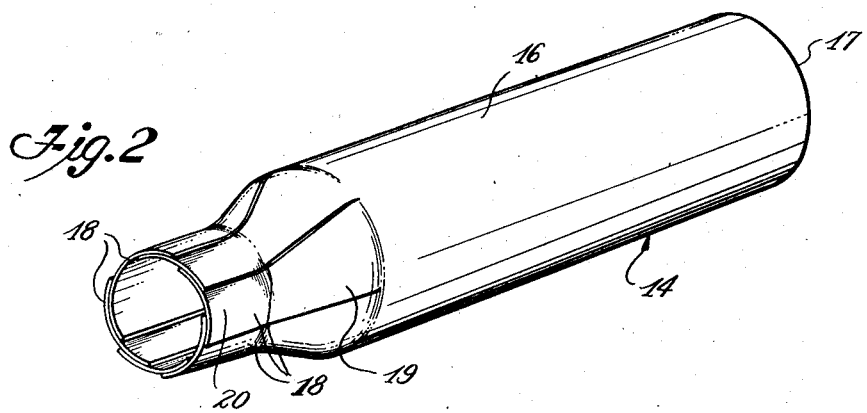
Figure 3:
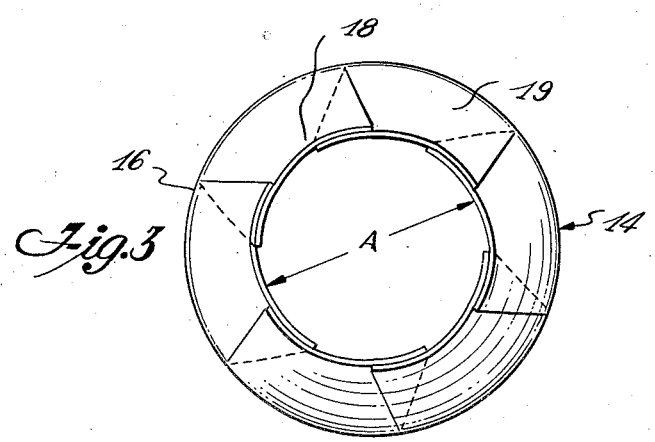

Other objects and advantages of my invention will be apparent in the following description and claim, considered together with the accompanying drawings, in which Fig. 1 is a partial perspective view of the rear portion of an automotive vehicle showing a tail pipe extension embodying the invention secured to a tail pipe;

Fig. 2 is an enlarged perspective view of the tail pipe extension of Fig. 1; and Fig. 3 is a still more enlarged end view of the necked-down portion of the tail pipe extension of Fig. 2.

Referring to Fig. 1, an automotive vehicle 10 may have a rear bumper 11, and a tail pipe 12 may extend from a forward portion of the vehicle toward the bumper 11. A bracket 13 may be provided near the end of the tail pipe for maintaining the end of the tail pipe in position with respect to the automotive vehicle. Inasmuch as the normal tail pipe 12 terminates several inches short of the bumper 11, a tail pipe extension 14 made particularly in accordance with the invention may be secured to the end of the tail pipe 12 that projects past the bracket 13. A compression clamp 15 may be passed around the reduced portion of the tail pipe extension 14 to securely clamp the extension to the projecting end of the tail pipe 12. As clearly illustrated in Fig. 1, the tail pipe extension projects past the end of the bumper 11, delivering exhaust gases to the atmosphere completely out of contact with the bumper 11, thereby preventing corrosion.

Referring to Figs. 2 and 3, it will be noted that the tail pipe extension 14 may be formed of generally tubular stock, for example thin-walled steel tubing having a diameter in the range of two to four inches, and having a wall thickness on the order of a sixteenth of an inch. This thin-walled tubing may be formed in any suitable manner, such as by piercing billets or by welding together the edges of a strip of sheet metal. In any event, however, such tubing is commercially available, and may be bought in quantity for fabrication of the tail pipe extensions.

The tail pipe extension 14 accordingly may have a major body portion 16 formed of tubular material, and may have an outer end 17 that is cut off squarely. The inner end of the extension 14 must necessarily be necked-down by some suitable process so that the large diameter of the extension will match the diameter of the tail pipe to which it is secured. While various methods and techniques have been used for necking-down enlarged extensions, I have discovered that this necking operation may be performed in such a way as to produce at the same time a readily expansible connection so that the extension may be secured to any of a large number of tail pipes of different diameters. The general construction of this necked-down portion includes the slitting of the tubular stock material so that a plurality of strips are formed on the end of the tubular material, and these strips are then compressed inwardly so as to overlap one another.

The tubular material from which the extension is made may accordingly be sheared along axially parallel lines so that a plurality of integrally connected strips 18 are formed on the inner end of the extension. The shearing process or operation may be such as to depress the edge of one strip with respect to the edge of the other strip immediately adjacent thereto. The tubular stock thus slit may be subjected to a die forming operation so that the strips will be forced to overlie one another. Due to the fact, however, that the shearing operation initially displaces one edge with respect to another edge, the die forming operation will result in the orderly overlapping of the strips, as clearly shown in Figs. 2 and 3. This orderly overlap of one strip 18 upon another may be described as an iris type of overlay because of its similarity to the iris diaphragm or stock mechanism commonly employed in cameras. This type of overlay is greatly superior to common types of overlay, for example the overlay of alternate strips, inasmuch as the strips may be compressed or expanded without limit to form any desired diameter opening.

The strips 18 may be shaped as shown by the use of mating dies, and accordingly each strip 18 may have a conical portion 19 terminating in a cylindrical portion 20. The cylindrical portion 20 is adapted to contact the tail pipe 12 of the automobile, and accordingly forms the connecting portion for the entire extension.

The formed strips 18 are quite flexible in spite of a slight work-hardening effect due to the forming operation. As mentioned, these strips 18 overlie each other in orderly fashion so that an aperture A defined by the formed strips 18 may be readily enlarged or reduced in diameter. This enlarging operation may be performed readily by inserting a rod in the aperture A and rocking it about the axis. The aperture A may be readily reduced by merely placing a clamp ring, such as the clamp 15 of Fig. 1, around the strips 18 and tightening the clamp. It is preferred, however, to make the aperture A of maximum size so that any variations of diameter will be smaller than the finished aperture A, and therefore the securing clamp for the extension will reduce the aperture A to a size that will enable the strips 18 to grip a tail pipe securely.

I prefer to form my tail pipe extension of tubular steel stock and to chromium plate the finished extension. This not only improves the appearance of the extension, but also, as previously mentioned, reduces any tendency of corrosion. A presently preferred embodiment of the tail pipe extension employs a steel tube of 3" outside diameter, with a .05" wall and an overall length of about 11", together with an aperture A of about 1¾". It is obvious, however, that various other materials and dimensions could be employed, for example plain steel. Where a bright finish is desired, stainless steel or aluminum could also be utilized.

While I have described my invention with respect to a specific embodiment thereof, I do not limit myself to this specific embodiment, since it is obvious to those skilled in the art that various modifications could be made therein without departing from the true spirit and scope of the invention. Accordingly I limit myself only by the terms of the following claim.

I claim:

A tail pipe extension comprising a generally tubular body member that is open at one end, and a plurality of overlapping axially parallel strips formed on the other end of the tubular member and reduced in diameter with respect to the tubular member to form an adjustable tail pipe connection.

HERBERT L. TRAUTMANN.

REFERENCES CITED

The following references are of record in the file of this patent:

UNITED STATES PATENTS

| Number | Name | Date |
|---|---|---|
| Re. 19,195 | Hadley | June 5, 1934 |
| 186,125 | Graham | Jan. 9, 1877 |
| 2,322,213 | Amberg | June 22, 1943 |